United States Patent [19]

Hinnergardt et al.

[11] Patent Number: 5,332,589
[45] Date of Patent: Jul. 26, 1994

[54] TOMATO CALCIFICATION PROCESS

[75] Inventors: Larry C. Hinnergardt, Newton; Earl C. Eichelberger, Chesire, both of Conn.

[73] Assignee: Van Den Bergh Foods Co., Division of Conopco, Inc., Lisle, Ill.

[21] Appl. No.: 48,994

[22] Filed: Apr. 16, 1993

Related U.S. Application Data

[63] Continuation-in-part of Ser. No. 998,209, Dec. 30, 1992, abandoned.

[51] Int. Cl.$^5$ .................. G01N 33/00; A23B 7/00
[52] U.S. Cl. ............................. 426/231; 426/321; 426/615
[58] Field of Search ................. 426/231, 321, 615

[56] References Cited

U.S. PATENT DOCUMENTS

| | | | |
|---|---|---|---|
| 1,994,670 | 3/1935 | Scott | 426/262 |
| 2,437,937 | 3/1948 | Childs et al. | 426/321 |
| 2,549,781 | 4/1951 | Emmons et al. | 426/615 |
| 3,374,099 | 3/1968 | Bell et al. | 426/321 |
| 3,712,795 | 1/1973 | Hamshere et al. | 436/43 |
| 3,754,938 | 8/1973 | Ponting | 426/321 |
| 4,109,314 | 8/1978 | Meyer et al. | 426/231 |
| 4,308,030 | 12/1981 | Smith et al. | 436/79 |
| 4,353,930 | 10/1982 | Hirahara | 426/321 |
| 4,437,934 | 3/1984 | Nelson et al. | 426/231 |
| 4,504,504 | 3/1985 | Gaehring et al. | 426/321 |
| 4,871,678 | 10/1989 | Wahl et al. | 436/79 |
| 4,883,679 | 11/1989 | Sewon | 426/321 |
| 4,926,747 | 5/1990 | Hashimoto et al. | 426/231 |
| 4,961,945 | 10/1990 | Pearson | 426/321 |
| 5,001,067 | 3/1991 | Coleman et al. | 436/79 |
| 5,039,545 | 8/1991 | Sewon | 426/321 |
| 5,057,435 | 10/1991 | Denney | 436/79 |
| 5,112,639 | 5/1992 | Sewon | 426/321 |
| 5,151,284 | 9/1992 | Twyman | 426/324 |

OTHER PUBLICATIONS

Journal of Food Science, vol. 57, No. 5, 1991 pp. 1144-1148 entitled "Optimization of a Diced Tomato Calcification Process" by Floros et al.
Rosemount Analytical brochure "Model 1054A Series Microprocessor Analyzers".
Rosemount Analytical brochure "Models 222, 224, 225, and 228 Toroidal Conductivity Sensors".

*Primary Examiner*—George Yeung
*Attorney, Agent, or Firm*—Gerard J. McGowan, Jr.

[57] ABSTRACT

A process for preparing fruits or vegetables and the fruits or vegetables prepared by the process. In particular, the vegetables may be diced tomatoes. The process comprises continuously exposing the diced fruits or vegetables to a calcium chloride solution comprising fruit or vegetable juice. The fruits or vegetables are exposed to the solution for a predetermined period of time. Calcium chloride solution is continuously recovered, measured and compared to a predetermined value or programmable controller microprocessor set-point. Any necessary adjustments are made to maintain the concentration within the accepted range of a predetermined value. The adjusted solution continuously feeds a nozzle bathing the diced fruits or vegetables.

13 Claims, 1 Drawing Sheet

TOMATO CALCIFICATION PROCESS

This is a continuation-in-part application of Hinnergardt et al. Ser. No. 07/998,209, filed Dec. 30, 1992, now abandoned.

BACKGROUND OF THE INVENTION

Commercial tomato products increasingly employ diced tomatoes, since diced tomatoes provide tomato particulates and flavor to such products. It is known that the firmness of the diced tomato particulates can be enhanced by the addition of calcium through adding calcium chloride. It is known to add the calcium chloride directly as a pre-weighed quantity or as part of the tomato topping juice for the diced tomatoes to maintain control of the calcium concentration of the finished product within legal constraints.

Typically, diced tomatoes are filled into a can and the calcified juice/puree is added, after which the cans are seamed and heat processed. Alternatively, a measured quantity of calcium chloride is added to the can which has been filled with tomatoes and the topping juice. The can is then sealed and heat processed.

Eamons et al. U.S. Pat. No. 2,549,781 discloses a process for canning fruits and vegetables comprising placing a charge of NaCl in a can, filling the can with a fruit or vegetable, adding to the top of the material a measured amount of dry calcium chloride, closing the can and subjecting the contents to a cooking temperature.

IFT Institute of Food Technologists 1989 presentation entitled "Optimization of a Diced Tomato Calcification Process" by John D. Floros et al. indicated the feasibility and desirability of controlling tomato dice firmness through strict calcium control in a batch process wherein the calcium chloride is introduced in a calcium chloride aqueous solution. Floros et al. "Optimization of a Diced Tomato Calcification Process," J. Food Sci. 57 pp. 1144–1147 (1992) is said to be based on the IFT paper. The authors indicate that processing of diced tomatoes at a $CaCl_2$ concentration of 0.43% for 3.5 minutes would yield a product with improved firmness.

While Floros et al. indicate the desirability of strict calcium control, they do not teach how the small laboratory batch process could be applied to a workable continuous production process. In particular, Floros et al. do not indicate how the solution containing calcium chloride which is recirculated could be quickly measured to determine the calcium chloride concentration and such concentration quickly readjusted to replace the calcium absorbed by the tomato dices.

Sewon U.S. Pat. No. 5,039,545 is directed to a brine for conserving cucumber in bulk, which is low in sodium chloride. The brine includes at least 0.1 g calcium chloride. It is said that the brine can be reused after addition of sodium chloride and calcium chloride and acid to compensate for chemicals absorbed by the cucumbers during conservation. The reusable brine is said to avoid the serious effluent problems of conventional brines due to their high chloride content.

Sewon U.S. Pat. No. 5,112,639 is based on a continuation-in-part application of Sewon U.S. Pat. No. 5,039,545 discussed above. The invention relates to a brine for conserving cucumbers in bulk which is low in sodium chloride and optionally sodium free. The sodium chloride content of the brine is lowered or even partly or completely replaced by calcium chloride, provided the content of ingestible acids such as acetic and lactic acids are simultaneously kept at a relatively high level.

Meyer et al. U.S. Pat. No. 4,109,314 is directed to a fruit analyzer for testing fruit and fruit juice samples to obtain automatically test data relating thereto and for using the data to compute and print out characteristic parameters. A computer controlled testing unit has a suspended plummet soluble solids testing means including plummet, weight and temperature transducers as well as an acid testing means including liquid weight and pH transducers for automatic titration of the contents. Various other parameters are said also to be computed. Fruit juice is transferred from the test vessels to a waste disposal.

Rosemount Analytical Model 1054A Series Microprocessor Analyzers brochures disclose that the model 1054As with the appropriate sensors are designed to continuously measure conductivity, percent concentration and residual chlorine of industrial processes. Calibration is said to be easily accomplished by immersing the sensor in a known solution and entering the value. Measurement of 0 to 15% $CaCl_2$ is mentioned. However, nothing is said about measurement of $CaCl_2$ in complex solutions such as tomato juice.

SUMMARY OF THE INVENTION

The present invention is directed to the discovery of a process for applying calcium chloride, particularly calcium chloride in tomato juice, to fruits or vegetables, such as tomatoes, on a continuous basis. The process has been found to be particularly useful for diced fruits or vegetables. The process has the advantage that the maximum firmness of the fruit or vegetable can be obtained prior to processing and the final product quality is improved. The improved product quality obtained in this process can be maintained even if the product has to be pumped as a part of the process.

The process of the invention permits precise control of the concentration of calcium chloride and the time of exposure and avoids the concomitant need to wash calcium chloride off tomatoes and/or tomato pieces to avoid exceeding the legal limit of calcium (800 ppm $Ca^{+2}$ in the U.S.). The process allows using the least amount of calcium to obtain the maximum tomato piece firmness. Advantages of the process include but are not limited to: allowing continuous processing of diced tomatoes, accurate control of the amount of calcium in the solution at all times, and automatic replacement of calcium as it is absorbed by the tomato, vegetable or fruit or pieces thereof.

Accuracy of calcium application can be achieved using batch methods. However, they waste calcium chloride and create disposal problems.

Applying the calcium chloride immediately after dicing has the advantage that the diced tomatoes firm before they are subjected to further mechanical or physical degradation.

The invention is directed also to diced tomatoes which have a definable firmness range and to diced tomatoes which are made in accordance with the present process. In particular shear values for the diced tomatoes should range from 140 to 400 lbs. force range, especially from 190 to 300 lbs. The most useful range is 200 to 260.

The process of the invention includes continuously treating fruits or vegetables with a solution including calcium chloride, preferably a fruit or vegetable juice, most preferably tomato juice, at a first point in the process, removing the calcium chloride solution from the processing line at a second point in the process downstream from the first point, and feeding the calcium chloride solution to a recirculation tank. A recycle loop for the tank is utilized to continuously measure and compare the conductivity of the solution to the predefined conductivity number or set point. Calcium chloride is then fed into the recirculation tank to adjust the concentration to the predefined amount. Adjustment of the quantity of calcium chloride to be added is determined by a microprocessor and a pneumatically activated or actuated valve is activated to adjust the concentration. The volume of juice or water in the system is controlled by a level control sensor (system) mounted in the mix tank. The solution having the adjusted concentration is then fed to the first point in the process wherein the fruits or vegetables are treated with the calcium chloride solution.

The process has been found to be useful in connection with tomatoes which have been diced. However, the invention is applicable to any fruit or vegetable to which calcium chloride is to be applied, in any form, including whole fruits or vegetables, i.e., unpeeled and uncut, whole-peeled or partially-peeled fruits and vegetables, and fruits and vegetables which have been in any way cut, e.g., by dicing, comminution or other cutting, etc or otherwise treated.

DETAILED DESCRIPTION OF THE INVENTION

Figure 1:
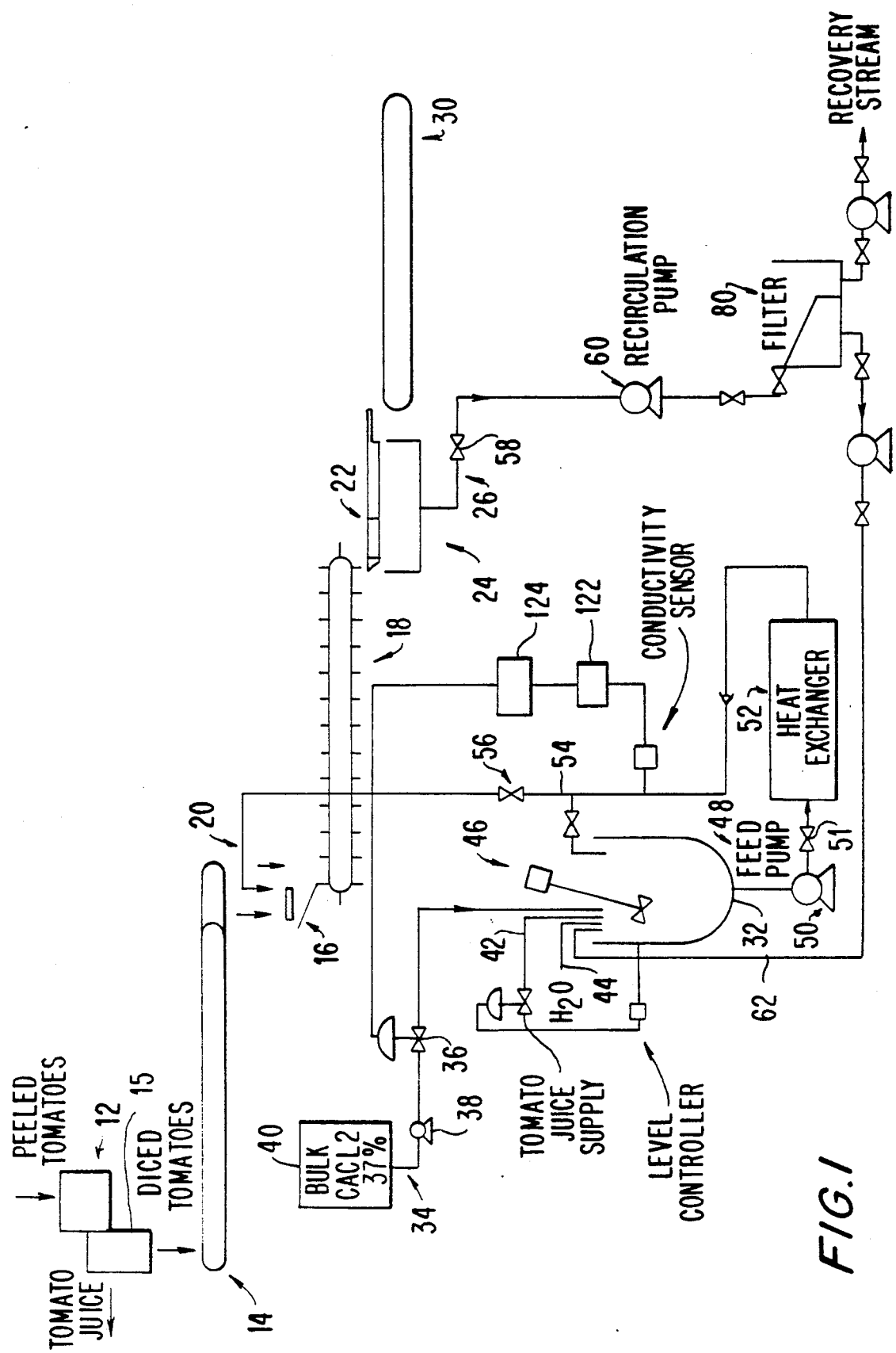
FIG. 1 is a schematic diagram of the process of the invention.

The invention is best understood by reference to FIG. 1, which discloses a process for firming diced tomatoes.

Prior to beginning the processing of the tomatoes a Rosemount Toroidal Conductivity Sensor Model 225 is tested to ascertain the sensor response to standardized calcium chloride solutions containing 0 to 5% concentrations of calcium chloride. It is found that the response is reproducible and can be adjusted to reflect the solids content of the tomato juice. The instrument is calibrated by correlating the response in millisiemens to known concentrations of calcium chloride. The known concentrations of calcium chloride are then analyzed by recognized official methods of analysis for calcium. These data are correlated to the conductivity numbers to reflect the added calcium in the solution. When tomato juice is used as the solvent for the calcium chloride solution, the zero percent reading gives the background level of calcium in the tomato juice. The zero percent reading allows the operator to adjust for the daily variation of soluble solids in the tomato juice. It is our finding that the variation caused by the variation in tomato soluble solids is a relatively small factor when compared to the influence of the calcium chloride on the conductivity meter reading.

Peeled tomatoes are fed into dicer 12. Diced tomatoes emerge from vibratory screen 15 and are fed to conveyor belt 14. Preferably, the tomato dice are contacted with the calcium chloride solution at slide 16 where the diced tomatoes enter the calcium application system. This promotes the distribution of dices onto application belt 18. Additional solution is added to ensure the dices are completely immersed in the solution. It is advantageous to have all of the dices submerged in the solution. To that end, a bar is placed across application belt 18 so that the dices will be leveled off with the top of the solution on the belt. The solution may consist of calcium chloride dissolved in water or, more preferably, it may comprise calcium chloride dissolved in a vegetable or fruit juice, especially tomato juice. Use of juice rather than a solution of only water and $CaCl_2$ improves the dice yield and tends to avoid the need for acidifying the calcium chloride solution to minimize microbiological growth during the expected processing periods of, say 6 hours or more. However, a food grade acid such as citric acid may be added, if desired. The preferred pH for the calcium chloride solution is from 3.5 to 4.3, especially from 3.8 to 4.1.

The calcium chloride in the solution is the agent responsible for the resulting increases in the firmness of the diced tomatoes being firmed by our process. One mechanism is the calcium reacting with the pectin in the diced tomatoes to maximize the tomato dice firmness. The use of tomato juice in the solution is thought to prevent or at least slow the leaching of some soluble pectins required to react with the calcium. The calcium chloride is known to inhibit or stop action of enzymes known to degrade the pectin in the tomato cell walls. This process is amenable to treatment with other calcium salts (i.e. such as but not limited to mono calcium phosphate and calcium citrate).

By treating the diced tomatoes early in the procedure of transporting the diced tomatoes to their ultimate containers, it has been found that the quality of the dices, particularly the firmness thereof, is improved. The manner of preparation will be described in more detail.

The calcium chloride solution may be applied to the diced tomatoes in any convenient manner, such as immersing or spraying or combinations thereof. In the case of conveyer 18, calcium chloride solution is fed to the surface of the conveyer which has means permitting the solution to pool on the conveyer surface so that the tomatoes can be immersed in the solution while being transported by the conveyer belt. The belt speed of the conveyer belt is variable. The belt speed is controlled at a fixed rate to permit the diced tomatoes to be immersed in the calcium chloride solution for a preferred time of 2 minutes. Calcium chloride is supplied to conveyer belt 18 at its upstream end by juice application nozzles 20. The downstream end of conveyer belt 18 includes a vibratory shaker screen 22 into which the tomatoes are passed. The vibratory shaker 22 includes draining screens which permit the fluid in which the dice tomatoes were immersed to drain through the tray to collecting tank 24 and recovery pipe 26. The immersed, drained diced tomatoes are collected and transported by a third conveying belt 30 which feeds dices into an aseptic diced tomato processing system. These dices could be fed into a normal diced tomato canning line at this point. However, the topping juice would have to be modified to reflect the fact the maximum allowable calcium is contained in the tomatoes and not the juice. Normally the calcium would be introduced to the diced tomatoes via the topping juice at this stage of processing.

Tank 32 is used to mix the calcium chloride-containing solution. Various supply pipes feed into tank 32. Among these are pipe 34 equipped with valve 36 and pump 38 for pumping bulk calcium chloride slurry (37% in water) from storage tank 40. Supply pipe 42 connects a source of 5.5 brix tomato juice with the tank 32. Mixer 46 is provided to mix the ingredients fed into tank 32. Water pipe 44 is optional.

The bottom of tank 32 includes an opening which feeds into a line 48 leading to feed pump 50, valve 51, heat exchanger 52, feed pipe 54, valve 56 and to application nozzles 20.

Return pipe 26 leads through valve 58 to one or more recirculation pumps such as recirculation pump 60 through filter 80, past additional valves, if required, via pipe 62 into tank 32.

Valves controlling the feeding of lines 34, 42 and 44 into tank 32 are under the control of a microprocessor 124 (programmable controller utilizing programmed PID loop).

When it is desired to start up the system, tomato juice or water is fed into the mix tank 32 until the filled level is reached and the level control valve turns off the supply by providing an output to close the valve. Recirculation of the juice or water is started and the heat exchanger system is engaged to reduce the juice temperature to a maximum of 115° F. (the juice will be continued to be cooled to a temperature under 100° F. even though the next step in the process will be started). The calcium chloride is added when the juice temperature has been cooled to 115° F. by setting the concentration set point on the programmable controller microprocessor. Calcium chloride continues to be supplied to the mix tank until the sensor in the recirculation line, sending continuous signals to the microprocessor, signals the set point for calcium chloride has been reached. The microprocessor will then shut off the supply of calcium chloride to the mix tank. For example, the calcium chloride concentration could be set at 0.5%. The ingredients are mixed by mixer 46, after which valve 51 is opened and feed pump 50 is activated. The mix is fed through heat exchanger 52 which adjusts the temperature of the calcium chloride solution to a temperature of from 70° to 115° F., especially from about 85° to 95° F. The solution is then pumped through valve 56 and through application nozzles 20 onto chute 16 and application conveyer belt 18 where the diced tomatoes are permitted to immerse in the calcium chloride solution.

In accordance with the invention, calcium chloride solution exiting the application conveyer belt 18 with the diced tomatoes at vibratory shaker screen 22 below the vibratory shaker screen 22 is recovered in recovery hopper 24. Valve 58 is open so that the recovered calcium chloride solution proceeds through return pipe 26 and is pumped by recirculation pump 60 through filter 80 wherein any insolubles and tomato particulates larger than 3/16" are removed and pumped from the system using the filter waste pump to be recovered and processed into tomato paste. The filtered calcium chloride solution is returned to mix tank 32 through the return pump and return pipe 62, which leads back to tank 32. In the tank, the solution added back is continually mixed with the contents already in the tank by mixer 46.

A conductivity probe is in contact with the juice in the juice recirculation piping for the mix tank 32 and is connected to a conductivity analyzer 122 which measures continuously the concentration of calcium chloride in the juice that is being recirculated to the mix tank. The Rosemount conductivity meter has been found to be useful because it can continuously and instantaneously determine the chloride in the solution and provide continuous monitoring of the calcium chloride in the system. The Rosemount conductivity readings were validated by taking juice samples and having them analyzed by accepted AOAC methods for analyzing calcium and/or calcium chloride.

The measurements from the conductivity analyzer are conveyed to a microprocessor 124, which compares the value measured with a predetermined value. The Rosemount(R) Analytical Model 1054A Series Microprocessor Analyzer located at the control panel has been found suitable in this respect. If the values do not match, the program in the microprocessor (the Allen-Bradley 1785 PLC-5 Programmable controller has been found to be a suitable microprocessor controller) will direct addition of calcium chloride as appropriate, to adjust the concentration to that which is desired. The instantaneous analysis of the calcium chloride solutions work best if there are no other chloride containing salts present or added to the solution such as sodium chloride. Should it be desirable to add chloride salts other than calcium chloride to the solution, the Rosemount microprocessor can be calibrated to accommodate for the extra chloride in the system. Failure to adjust the Rosemount analyzer for the background chloride level of the tomato juice or water before adding the calcium chloride can result in misleading conductivity readings.

In general, the amount of calcium chloride deposited on and in the tomato pieces will be in the range of from 850 to 1200 ppm $Ca^{+2}$, especially from 900 to 1100 ppm calcium. The amount of calcium being deposited on the tomatoes can be adjusted so that one skilled in the art can control the calcium content of the diced tomatoes in the final product to between 700 to 800 ppm.

It will be seen, that the present process permits instantaneous adjustments of the calcium chloride concentration in the solution which is returned to the tank 32. This permits recirculation of the solution, which would not otherwise be possible if at the same time it is desired to keep the calcium chloride concentration within a narrowly defined range. This is so since the concentration of calcium chloride present in the solution recovered in recovery tank 24 and coursing through return pipe 26 will be different from that which is fed to the upstream end of second conveyer 18; the absorption of calcium chloride by the tomatoes or other fruits or vegetables can generally be expected to diminish the concentration of the calcium chloride in the calcium chloride solution which is recovered at the downstream end of the application belt 18.

The ability to recover and reuse calcium chloride solution results in less waste to be passed on to the environment. Although it would be possible to add calcium chloride later in the processing of the diced tomatoes without the need for passing wasted calcium chloride solution to the environment, it has been found that treatment with calcium chloride solution earlier in the processing of diced tomatoes results in firmer diced tomatoes that are better able to withstand further processing. Also, the present system permits cessation of immersing of the diced fruits or vegetables in the $CaCl_2$ if desired. For instance, in the event that a stoppage occurs in the manufacturing line, the application of the calcium chloride solution can be readily discontinued and the $CaCl_2$ solution removed from the dices. This avoids overcalcification, which would require removal of excess calcium from the fruit. Over calcification in the calcium application system described is also prevented because of the continuous monitoring of the calcium in the solution. The monitoring system automatically shuts off the supply of calcium chloride to the mix tank when the desired level is reached. The monitoring system described herein will also prevent under calcification of the tomato dices by making sure calcium chloride is added to the system when the calcium chloride falls below a specified concentration.

The sales brochures for Rosemount Analytical Model 1054A Series Microprocessor Analyzers and Models 222, 224, 225 and 228 Toroidal Conductivity Sensors enclosed herewith are incorporated by reference herein.

What is claimed is:

1. A method for processing a fruit or vegetable comprising continuously exposing the fruit or vegetable to a solution including calcium chloride at a first location, recovering the calcium chloride solution at a second location downstream from said first location, measuring the concentration of calcium chloride in said recovered solution, comparing the concentration of calcium chloride in said recovered calcium chloride solution to a predetermined concentration, adjusting the calcium concentration in said calcium chloride solution to the predetermined amount, and feeding the solution having the adjusted concentration to said first location.

2. The process according to claim 1 wherein said calcium chloride solution is a solution of calcium chloride in tomato juice.

3. The process according to claim i wherein the calcium chloride solution is kept in a holding tank where it is adjusted by adding an ingredient selected from the group consisting of water, tomato juice, calcium chloride and mixtures thereof.

4. The process according to claim 1 wherein the fruit is a tomato.

5. The process according to claim 1 wherein the concentration of said calcium chloride solution is compared to the predetermined amount by a microprocessor.

6. The process according to claim 1 wherein the concentration of calcium chloride solution to which the fruit or vegetable is exposed is from 0.5 to 5% by weight calcium chloride and the time of exposure is from 10 seconds to 6 minutes.

7. The process according to claim 6 wherein the concentration of calcium chloride solution to which the fruit or vegetable is exposed is from 0.5 to 1% by weight calcium chloride.

8. The process according to claim 1 wherein said calcium chloride solution is a solution of calcium chloride in vegetable juice.

9. The process according to claim 5 wherein the microprocessor is a programmable controller microprocessor.

10. The process according to claim 6 wherein the time of exposure is from 20 seconds to 3 minutes.

11. The process according to claim 4 wherein the fruit is a diced tomato.

12. The process according to claim 1 wherein the fruit or vegetable is diced.

13. The process according to claim 1 wherein the fruit or vegetable is whole-peeled.

* * * * *

UNITED STATES PATENT AND TRADEMARK OFFICE
CERTIFICATE OF CORRECTION

PATENT NO. : 5,332,589
DATED : July 26, 1994
INVENTOR(S) : Larry C. Hinnergardt, Earl C. Eichelberger It is certified that error appears in the above—identified patent and that said Letters Patent is hereby corrected as shown below:

Column 7,
Claim 3, line 1, replace "claim i" with —claim 1—.

Signed and Sealed this

Eighteenth Day of October, 1994

Attest:

BRUCE LEHMAN

Attesting Officer        Commissioner of Patents and Trademarks